(12) United States Patent
Takeuchi (10) Patent No.: US 6,408,038 B1
(45) Date of Patent: Jun. 18, 2002

(54) RECEIVER AND RECEIVING CIRCUIT

(75) Inventor: Isao Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/147,483

(22) PCT Filed: May 11, 1998

(86) PCT No.: PCT/JP98/02066

§ 371 (c)(1),
(2), (4) Date: Jan. 8, 1999

(87) PCT Pub. No.: WO98/52313

PCT Pub. Date: Nov. 19, 1998

(30) Foreign Application Priority Data

May 13, 1997 (JP) ............................................. 9-122223

(51) Int. Cl.[7] ........................... H04L 27/06; H04D 1/00; H03H 7/40; H03K 5/159
(52) U.S. Cl. ......................... 375/341; 375/342; 375/231
(58) Field of Search ................................ 375/341, 344, 375/342, 231

(56) References Cited

U.S. PATENT DOCUMENTS

| | | | |
|---|---|---|---|
| 5,436,928 A | * 7/1995 | Fukuawa et al. ........... 375/232 |
| 5,608,764 A | * 3/1997 | Sugita et al. ................ 375/344 |
| 5,719,899 A | * 2/1998 | Thielecke et al. .......... 375/206 |
| 5,790,784 A | * 8/1998 | Beale et al. ........... 395/200.01 |
| 5,802,117 A | * 9/1998 | Ghosh .......................... 375/344 |
| 6,044,107 A | * 3/2000 | Gatherer et al. ............. 375/222 |
| 6,128,276 A | * 10/2000 | Agee ........................... 370/208 |
| 6,130,859 A | * 10/2000 | Sonnenschein et al. ..... 367/134 |

* cited by examiner

*Primary Examiner*—Chi Pham
*Assistant Examiner*—Tony Al-Beshrawi
(74) *Attorney, Agent, or Firm*—Jay H. Maioli (57) ABSTRACT

A receiving apparatus receives a digital broadcast signal having been modulated in an orthogonal frequency multiplexing method of which data of each frame is composed of a synchronous reference signal and transmission data and of which data is assigned to a plurality of carriers that are orthogonal to each other. A synchronous TFPR signal is transmitted every frame. An AFC (automatic frequency control) circuit receives the synchronous TFPR signal, and obtains a frequency error and a timing error of the received signal to control the frequency and the timing. To remove an influence of a multi-path to the synchronous TFPR signal, an equalizer is disposed. The influence of the multi-path to the synchronous TFPR signal is removed by the equalizer. Thus, the frequency and the timing of a carrier of the receiver side can be exactly controlled.

5 Claims, 10 Drawing Sheets

RECEIVER AND RECEIVING CIRCUIT

TECHNICAL FIELD

The invention relates to a receiving apparatus suitable for Eureka DAB (Digital Audio Broadcasting) System, in particular, to an improvement on an influence of a multi-path to a timing detection signal.

BACKGROUND ART

As an example of digital audio broadcast systems, Eureka DAB System developed by European Eureka 147 Project is known. In Eureka DAB System, MPEG (Moving Picture Experts Group) layer 2 is used as an audio encoding method. In addition, OFDM (Orthogonal Frequency Division Multiplexing) is used as a modulating method. With such methods, Eureka DAB System broadcasts six channels of high quality stereo programs and one channel of data in a transmission band of 1.50 MHZ.

Figure 1:
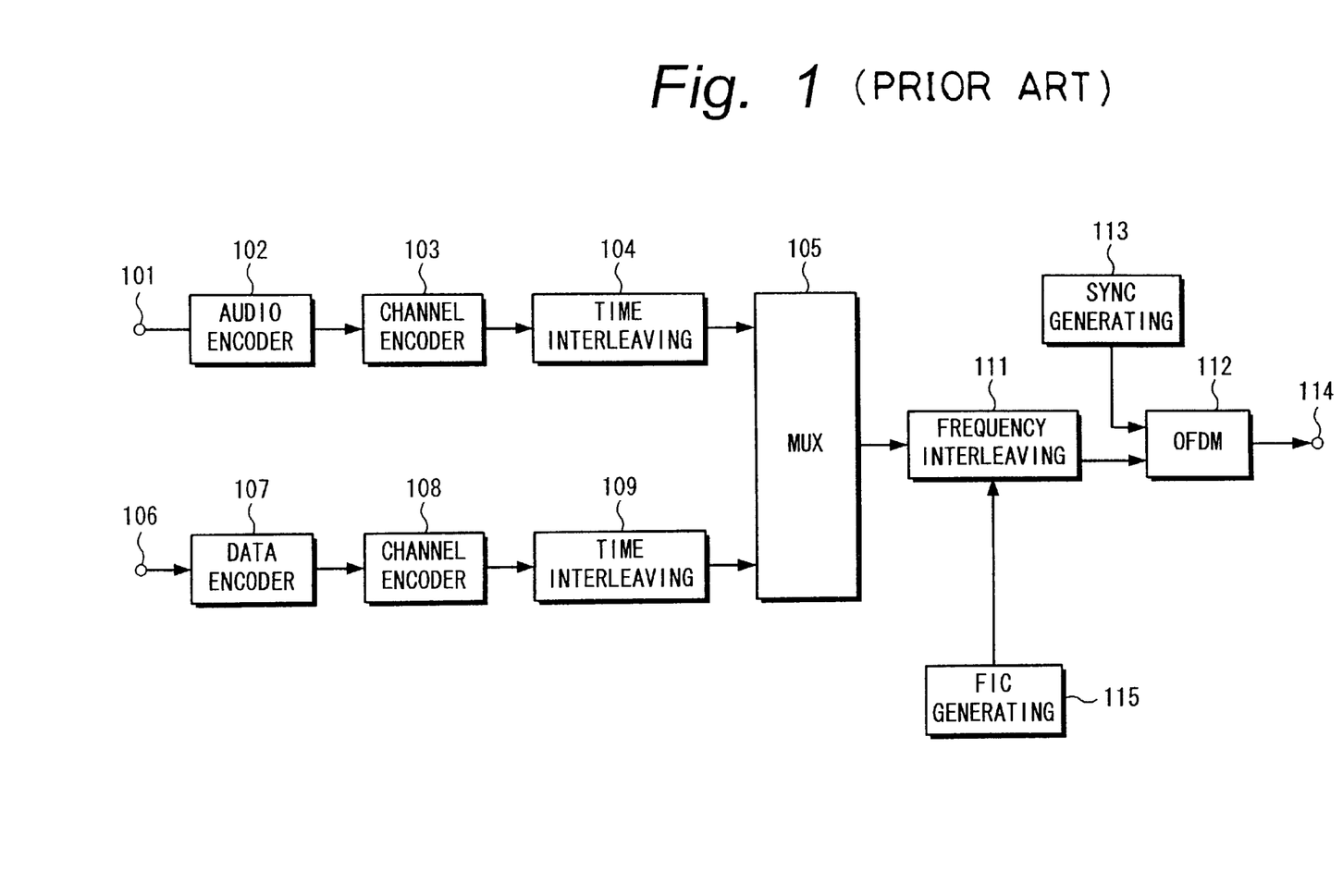
FIG. 1 is a prior art block diagram showing an example of a transmitter for Eureka DAB System.

FIG. 1 shows the structure of the transmitter side of Eureka DAB System. In FIG. 1, audio data is supplied to an input terminal 101. The audio data is supplied from the input terminal 101 to an audio encoder 102. The audio encoder 102 compresses the audio data.

In Eureka DAB System, as a compressing process of audio data, MPEG layer 2 is used. The MPEG layer 2 audio compressing method is a sub-band encoding method in which an input signal is divided into a plurality of frequency bands and each divided signal is independently encoded. In other words, input audio data is divided into 32 sub-bands with a bandwidth of 750 Hz by an analyzing filter bank. In addition, an FFT (Fast Fourier Transform) process is performed for the input audio data so as to analyze individual components of these bands. Corresponding to the result of the FFT process, masking is calculated and bits are assigned to the individual bands.

An output signal of the audio encoder 102 is supplied to a channel encoder 103. The channel encoder 103 performs an encoding process for the compressed audio data with an error correction code such as a convolutional code.

An output signal of the channel encoder 103 is supplied to a time interleaving circuit 104. The time interleaving circuit 104 interleaves the signal received from the channel encoder 103 in the time direction. An output signal of the time interleaving circuit 104 is supplied to a multiplexer 105.

General data is supplied to an input terminal 106. The general data is information such as weather information and traffic information. General data received from the input terminal 106 is supplied to a data encoder 107. The data encoder 107 arranges the data received from the input terminal 106 in a predetermined format. An output signal of the data encoder 107 is supplied to a channel encoder 108. The channel encoder 108 performs an encoding process for the signal received from the data encoder 107 with an error correction code such as a convolutional code. An output signal of the channel encoder 108 is supplied to a time interleaving circuit 109.

The time interleaving circuit 109 interleaves the signal received from the channel encoder 108 in the time direction. An output signal of the time interleaving circuit 109 is supplied to a multiplexer 105. Thus, the multiplexer 105 multiplexes the audio data received from the terminal 101 with the general data received from the terminal 106.

An output signal of the multiplexer 105 is supplied to a frequency interleaving circuit 111. An FIC generating circuit 115 supplies FIC (Fast Information Channel) data to the frequency interleaving circuit 111. The frequency interleaving circuit 111 interleaves the output signal of the multiplexer 105 and an output signal of the FIC generating circuit 115 in the frequency direction. An output signal of the frequency interleaving circuit 111 is supplied to an OFDM circuit 112. A sync generating circuit 113 supplies a TFPR signal and a null symbol to the OFDM circuit 112. Thus, the TFPR signal and null symbol are added to the output signal of the frequency interleaving circuit 111.

The OFDM (orthogonal Frequency Division Multiplexing) method is a multi-carrier modulating method using a plurality of carriers that are perpendicular to each other. The OFDM circuit 112 correlates digital data with data in frequency region and performs an IFFT (Inverse Fast Fourier Transform) process so as to convert data in frequency region into digital data in time region.

An output signal of the OFDM circuit 112 is obtained from an output terminal 114. The output signal is modulated by π/4 QPSK modulating method and converted into a signal with a predetermined transmission frequency.

Figure 2:
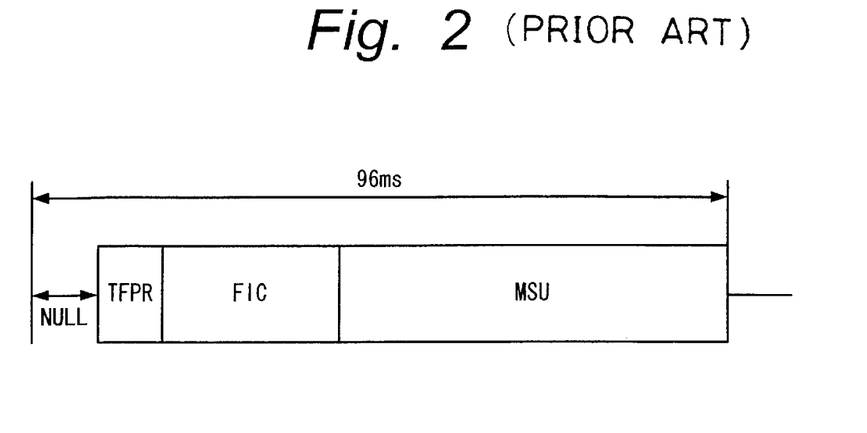
FIG. 2 is a prior art schematic diagram for explaining the structure of a transmission frame used in Eureka DAB System.

FIG. 2 shows the structure of a transmission frame transmitted in Eureka DAB System. As shown in FIG. 2, at the beginning of the transmission frame, a null symbol is disposed (thus, the relevant RF signal is not transmitted). The null symbol is used to coarsely synchronize with the received signal. The null symbol is followed by a TFPR signal. The TFPR signal is a reference symbol for controlling the frequency and synchronization of the received signal. The TFPR signal is followed by FIC (Fast Information Channel) data. The FIC data is control data that includes service information, display data, program service label, time and date, broadcast station ID, presence/absence of simultaneous service, and broadcast information of other channels. The FIC data is followed by MSC (Main Service Channel) data. The MSC data is general data such as music data, weather information, traffic information, and program list.

Eureka DAB System broadcasts signals through a satellite and VHF ground broadcasting stations. In Europe, the following three bands of frequencies have been assigned to Eureka DAB System.

Band 1 (47 MHz to 68 MHz)
Band 3 (174 MHz to 240 MHz)
L Band (1.452 GHz to 1.492 GHz)

In addition, depending on a frequency for use, as a hybrid method, both ground broadcasting stations and a satellite can be used.

When a mobile substance such as an automobile receives a signal of a conventional FM broadcast or a conventional AM broadcast, the signal is subject to fading due to an interference of a wave reflected by a building or the like to a direct wave. In addition, since the signal is analog, the sound quality is not high and the signal is subject to noise.

On the other hand, in Eureka DAB System, since an audio signal which is transmitted is a digital signal, the audio signal quality is high and the audio signal is not subject to noise. In Eureka DAB System, the OFDM method is used. In the OFDM method, since data is allotted to many carriers, the duration of one symbol is long. In the OFDM method, since a guard interval is placed on the time axis, even if a multi-path of which the delay time of a reflected wave is smaller than the interval is present, the transmission characteristic does not deteriorate. Since the waveform of a digital signal of the OFDM method has a resistance to random noise, the signal does not adversely affects other communications. In addition, the signal is not adversely affected by other communications. When carriers are allocated at particular intervals on the frequency axis, a frequency interleave effect is substantially obtained. In a combination with an adequate error correction code, the signal has a resistance to frequency selective fading.

In Eureka DAB System, in addition to high quality of an audio signal, multi-lingual broadcasts and general information such as weather information and traffic information are available. In Eureka DAB System, general information can be used for paging and still pictures can be transmitted as general information.

By the way, as shown in FIG. 2, in each transmission frame used in Eureka DAB System, a null symbol is disposed at the beginning. The null symbol is followed by a synchronous TFPR signal. With the TFPR signal, the frequency and timing of the having received signal or the receiving signal are controlled.

Figure 3:
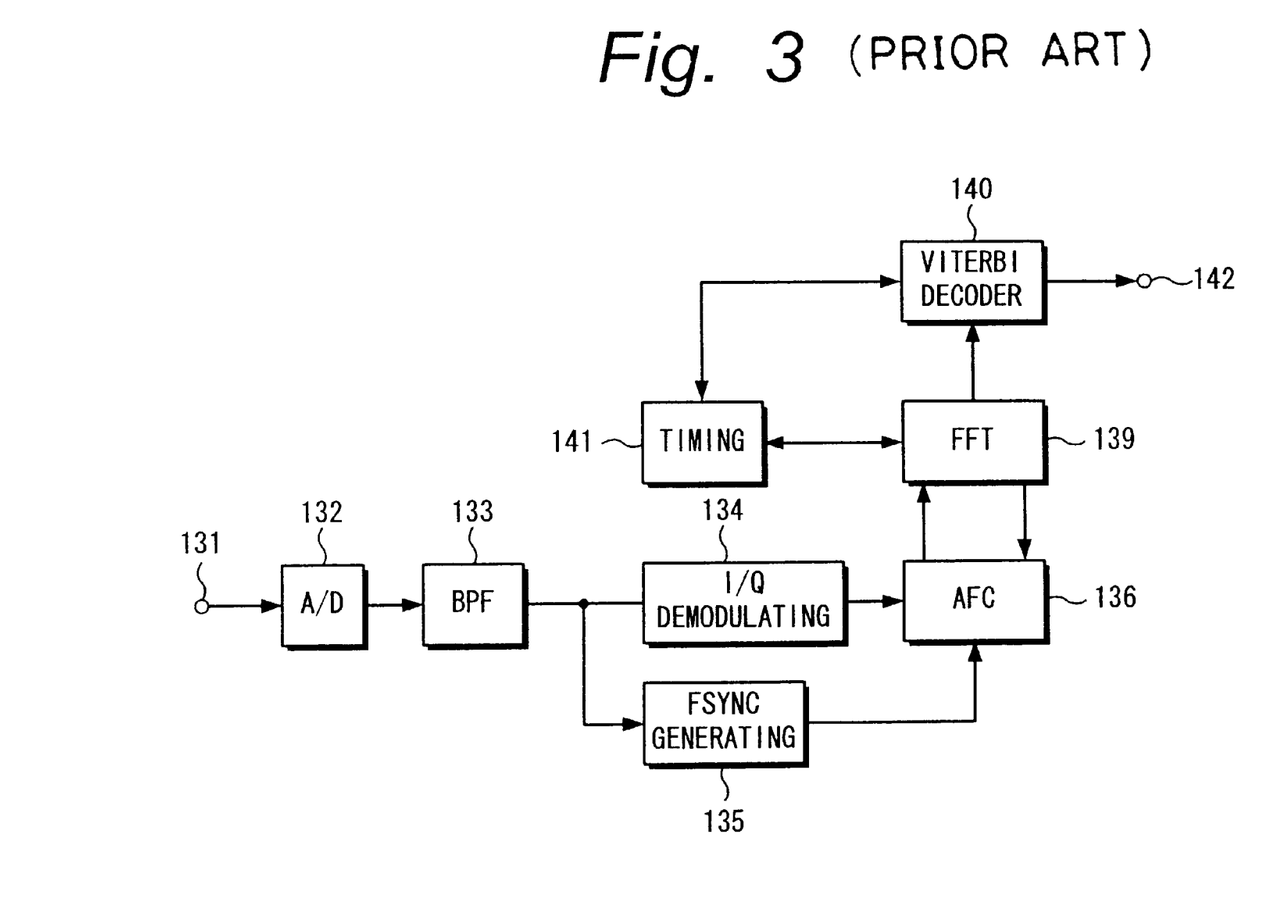
FIG. 3 is a prior art block diagram showing an equalizing circuit of a channel decoder of a conventional receiver for Eureka DAB System

FIG. 3 shows the structure of a channel decoder of a conventional receiver for Eureka DAB System. In FIG. 3, an intermediate frequency signal is supplied to an input terminal 131. The signal received from the input terminal 131 is supplied to an A/D converter 132. The A/D converter 132 digitizes the signal received from the input terminal 121 into a digital signal.

An output signal of the A/D converter 132 is supplied to an I/Q demodulating circuit 134 and a sync generating circuit 135 through a band-pass filter 133. The I/Q demodulating circuit 134 orthogonally detects the received signal and demodulates it into an I signal and a Q signal. Output signals of the I/Q demodulating circuit 134 are supplied to an AFC (Automatic Frequency Controlling) circuit 136.

The sync generating circuit 135 detects a null symbol and receives a TFPR signal. An output signal of the sync generating circuit 135 is supplied to an AFC circuit 136.

An output signal of the AFC circuit 136 is supplied to an FFT circuit 139. An output signal of the FFT circuit 139 is supplied to a Viterbi decoder 140. In addition, the output signal of the FFT circuit 139 is fed back to the AFC circuit 136. The FFT circuit 139 and the viterbi decoder 140 are controlled by a timing controlling circuit 141.

The AFC circuit 136 detects a null symbol, receives a TFPR signal corresponding to the null symbol, performs the FFT process for the TFPR signal, obtains a frequency error of the received signal corresponding to the result of the FFT process, and controls the frequency and timing of the received signal corresponding to the frequency error. In other words, the sync generating circuit 135 obtains the TFPR signal corresponding to the null symbol. The TFPR signal is supplied to the FFT circuit 139. The FFT circuit 139 performs the FFT process for the TFPR signal. The resultant signal is fed back from the FFT circuit 139 to the AFC circuit 136. The AFC circuit 136 obtains a frequency error and a timing error of the received signal corresponding to the signal of which the FFT process has been performed for the TFPR signal. Corresponding to the frequency error and the timing error, the frequency and the timing of a carrier of the having received signal or the receiving signal are controlled.

The FFT circuit 139 performs the FFT process for the OFDM signal so as to demodulate the OFDM signal to the original data which is data before transmitting. In Eureka DAB System, when data is transmitted, digital data is correlated with data in frequency region. Data in frequency region is converted into data in time region by the IFFT process. With a plurality of carriers that are orthogonal to each other, data is transmitted. The FFT circuit 139 demodulates the OFMD signal to the original data. The FFT circuit 139 maps the received data so as to perform the FFT process. Thus, the received signal, that is data in time region is converted into data in frequency region and demodulated to base band data.

An output signal of the FFT 139 is supplied to the Viterbi decoder 140. In addition, the output signal of the FFT 139 is fed back to the AFC circuit 136. The Viterbi decoder 140 performs a maximum likelihood decoding process for a convolutional code so as to perform an error correcting process. The FFT circuit 139 and the Viterbi decoder 140 are controlled by the timing controlling circuit 141. An output signal of the Viterbi decoder 140 is obtained from an output terminal 142.

In Eureka DAB System, with the TFPR signal, the frequency and timing of a carrier of the having received signal or the had received signal are controlled. However, the TFPR signal which is the reference for controlling the frequency and timing of the received signal may be affected by a multi-path.

Figure 4:
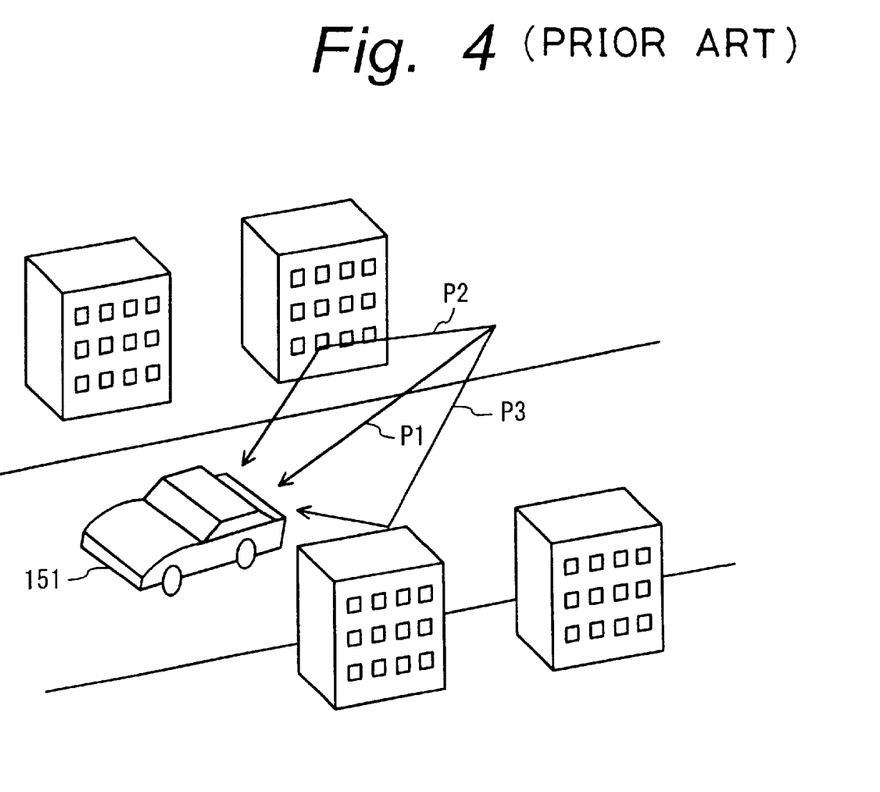
FIG. 4 is a prior art schematic diagram for explaining a multi-path.
Figure 5:
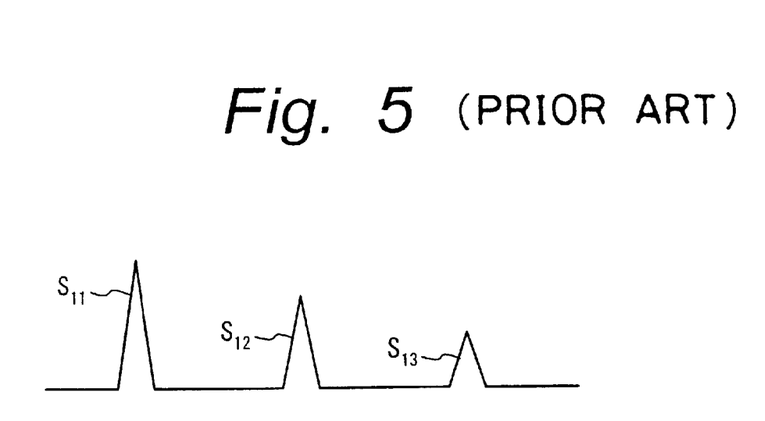
FIG. 5 is a prior art schematic diagram showing a waveform for explaining an influence of a multi-path to a TFPR signal.

In other words, as shown in FIG. 4, when a mobile substance 151 such as automobile and so on receives a digital audio signal of Eureka DAB System, there may be paths P2 and P3 of waves reflected by buildings and so forth as well as a path P1 of a direct wave. When there is a multi-path as shown in FIG. 5, the TFPR signal is received as signals $S_{12}$ and $S_{13}$ through the paths P2 and P3 of the reflected waves as well as a signal $S_{11}$ through the path P1 of the direct wave. When the TFPR signal is received through the multi-path, it becomes difficult to correctly control the frequency and timing of the received signal.

Therefore, an object of the present invention is to provide a receiving apparatus that allows an influence of a multi-path to a synchronous reference signal to be removed.

DISCLOSURE OF INVENTION

A receiving apparatus and a receiving circuit according to the present invention comprise a front-end for converting a digital broadcast signal into an intermediate frequency signal, the digital broadcast signal having been modulated in orthogonal frequency multiplexing method of which data of each frame is composed of a synchronous reference signal and transmission data and of which data is assigned to a plurality of carriers that are orthogonal to each other, demodulating means for demodulating the intermediate frequency signal that is output from the front-end into a base band signal corresponding to the synchronous reference signal that is output from detecting means, detecting means, disposed in the demodulating means, for detecting the synchronous reference signal of each frame from the intermediate frequency signal that is output from the front-end, equalizing means, disposed in the demodulating means, for removing a signal component received through multi-paths from the synchronous reference signal, and outputting means for outputting the signal demodulated by the demodulating means.

The equalizing means delays the synchronous reference signal that is output from the detecting means corresponding to the time difference between the receiving timing of the synchronous reference signal received through a path of a direct wave and the receiving timing of the synchronous reference signal received through a path of a reflected wave and subtracts the synchronous reference signal that is delayed corresponding to the ratio between the reception level of the synchronous reference signal received through the path of the direct reflected wave and the reception level of the synchronous signal received through the path of the reflected wave and that is output from the detecting means and the synchronous reference signal that is output from the detecting means.

In addition, the equalizing means has a delay circuit portion for delaying the reference signal that is output from the detecting means corresponding to a delay amount that is set corresponding to the time difference, a gain setting portion for setting a gain corresponding to the ratio of the reception levels, and a subtracting portion for subtracting the synchronous reference signal that is output from the delay circuit portion through the gain setting portion from the synchronous reference signal that is output from the detecting means.

The demodulating means has a detecting portion for orthogonally detecting the intermediate frequency signal that is output from the front-end, a signal processing portion for performing a fast Fourier transform process for an output signal of the orthogonal detecting portion through the equalizing means, and a Viterbi decoder to which an output signal of the signal processing portion is supplied.

The receiving apparatus and the receiving circuit further comprise a frequency controlling circuit, disposed between the detecting means and the equalizing means, for receiving the synchronous reference signal from the detecting means, obtaining the frequency error of at least the synchronous reference signal with an output signal that is fed back from the signal processing portion, and controlling the frequency of the synchronous reference signal that is output from the detecting means.

BEST MODE FOR CARRYING OUT THE INVENTION

Next, with reference to the accompanying drawings, an embodiment of the present invention will be described. The present invention is suitable for a receiver for Eureka DAB System.

Figure 6:
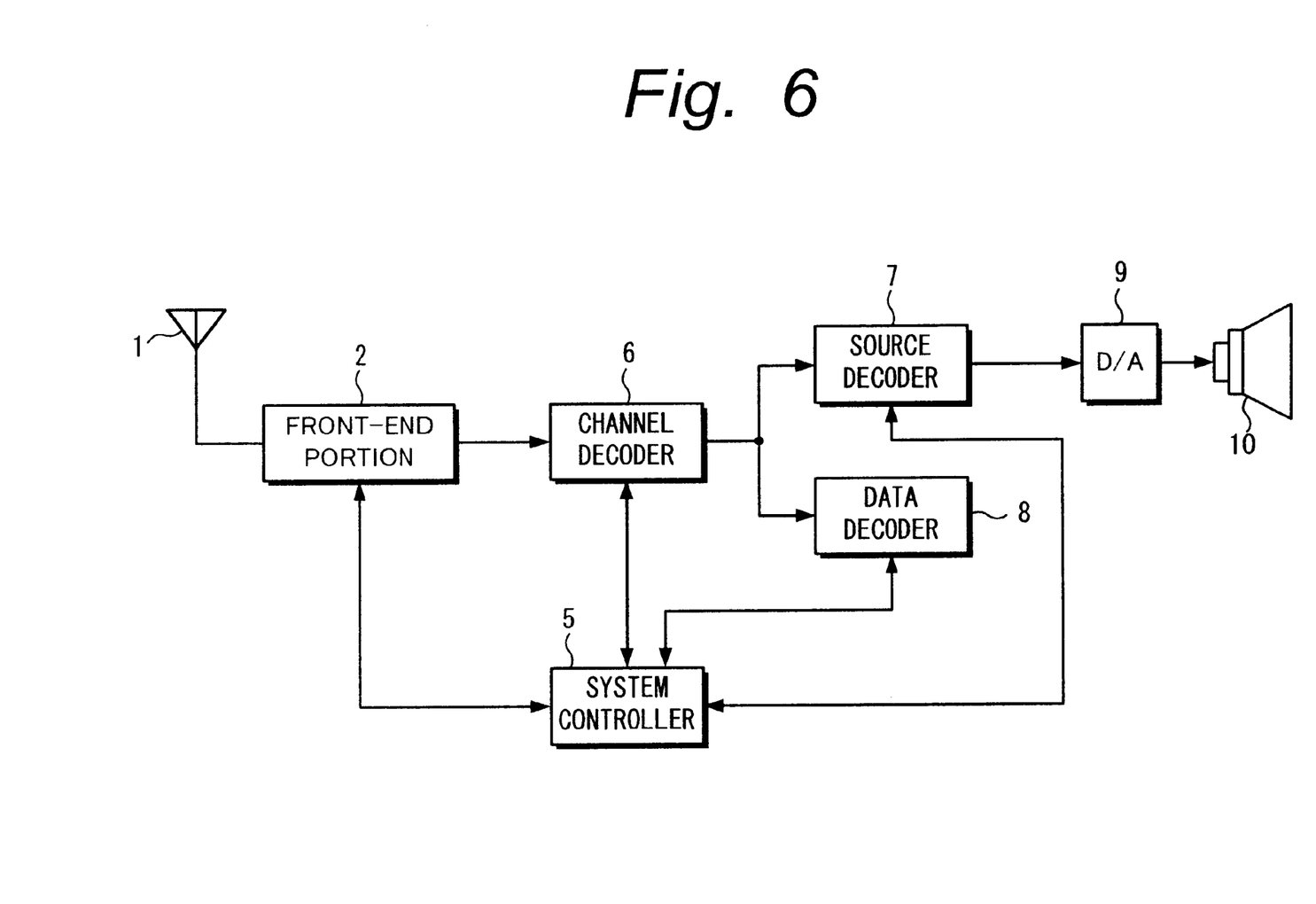
FIG. 6 is a block diagram showing an example of the structure of a receiver for Eureka DAB System according to the present invention.

FIG. 6 shows the structure of a receiver for Eureka DAB System according to the present invention. In FIG. 6, an antenna 1 receives a broadcast signal of Eureka DAB System. In Eureka DAB System, signals are broadcast in band 1 (47 MHz to 68 MHz), band 3 (174 MHz to 240 MHz), and L band (1.452 GHz to 1.492 GHz). In the bands 1 and 3, a signal received from the antenna 1 is supplied to a front-end portion 2.

Figure 7:
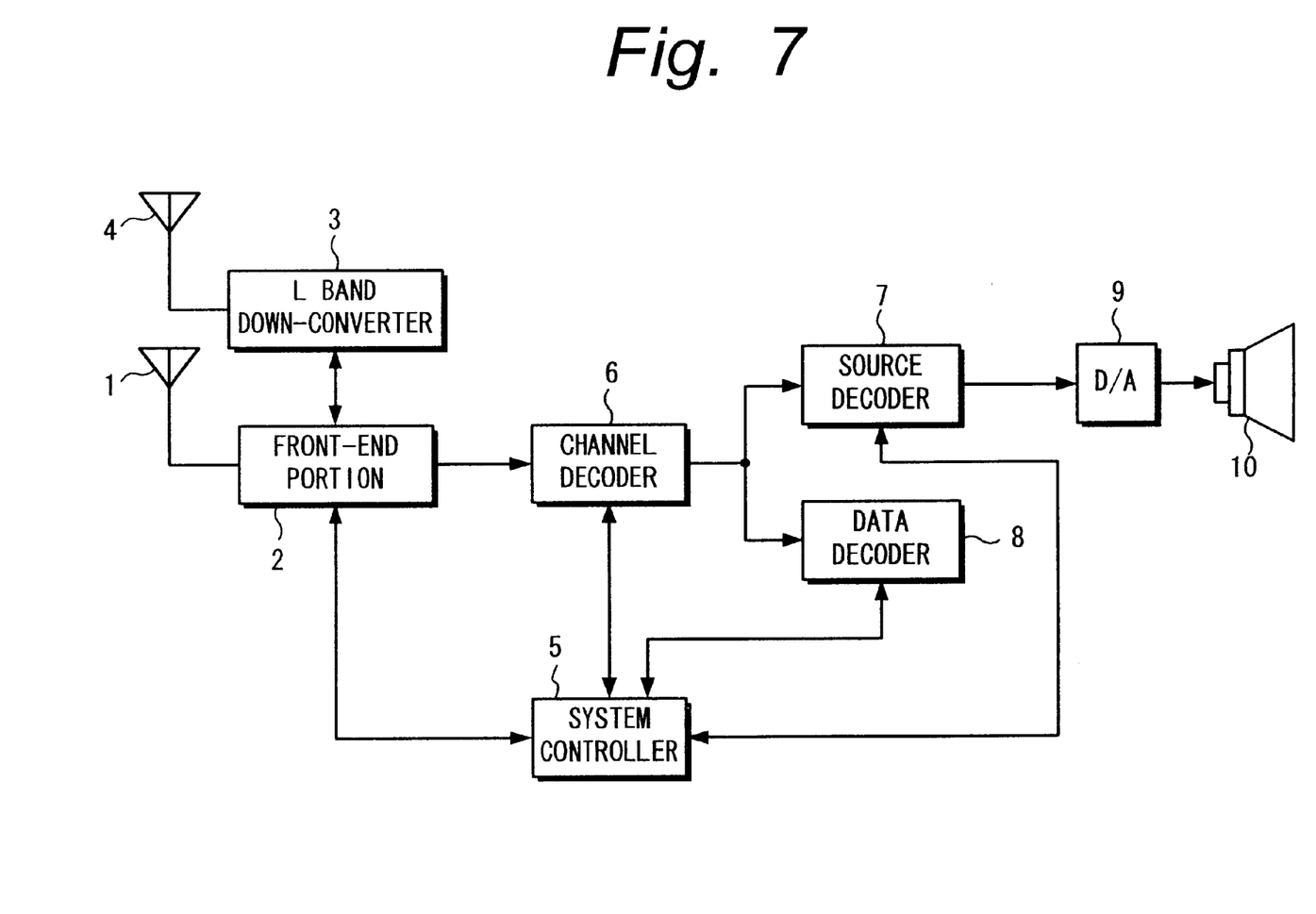
FIG. 7 is a block diagram showing an example of the structure of a receiver for Eureka DAB System according to the present invention in the case that an L band signal is received.

When a signal of the L band is received, an L band converter 3 shown in FIG. 7 is used. The L band converter 3 comprises an LNA (Low Noise Amplifier) and a frequency converting circuit. The LNA amplifies the received signal. The frequency converting circuit converts the received signal of the L band into a first intermediate frequency signal of 352 MHz to 392 MHz. An antenna 1 receives a signal of the L band for Eureka DAB System. The received signal is converted into a first intermediate frequency signal of 352 MHz to 392 MHz and then supplied to the front-end portion 2.

The front-end portion 2 selects a signal of a particular channel from the received signal and converts the selected signal into an intermediate frequency signal. A system controller 5 supplies a channel designation signal for selecting receiving signal to the front-end portion 2. An output signal of the front-end portion 2 is supplied to a channel decoder 6.

The channel decoder 6 demodulates the received signal which is received by the antenna 1 to a base band signal. In Eureka DAB System, transmission data is allocated to frames. An error correction code that is a convolutional code is added to the transmission signal. The resultant signal is modulated by the OFDM method and π/4 QPSK method. The channel decoder 6 comprises an I/Q demodulating circuit, an OFDM demodulating circuit, and a Viterbi decoding circuit. The I/Q demodulating circuit orthogonally detects the received signal and demodulates the signal to an I signal and a Q signal. The OFDM demodulating circuit performs the FFT process for the received signal and demodulates the OFDM signal into original data. The Viterbi decoding circuit performs an error correcting process for the received signal with a Viterbi code that is a convolutional code. The channel decoder 6 has an AFC (automatic frequency control) circuit that receives a synchronous TFPR signal and controls the frequency and timing of the received signal corresponding to the TFPR signal.

The channel decoder 6 demodulates the received signal to a base band signal and outputs audio data (that has been compressed corresponding to MPEG layer 2 method) and general data (such as control data and other data). The audio data is supplied to a source decoder 7. The general data is supplied to a data decoder 8.

The source decoder 7 performs a decoding process for output data of the channel decoder 6 corresponding to MPEG layer 2 method. The source decoder 7 decodes audio data that has been compressed corresponding to MPEG layer 2 method to original digital audio data which is data before transmitting. An output signal of the source decoder 7 is supplied to a D/A converter 9. The D/A converter 9 converts the digital audio signal into an analog audio signal and supplies the resultant signal to a speaker 10. The speaker 10 reproduces a music program that is broadcast in Eureka DAB System.

The data decoder 8 performs a decoding process for control data and general data such as above-mentioned weather information, traffic information and so on. An output signal of the data decoder 8 is supplied to a system controller 5. The system controller 5 displays control information and general information corresponding to the output signal which is supplied from the data decoder 8 on a display portion (not shown). Thus, user can obtain information such as the weather information, the traffic information and so on.

Figure 8:
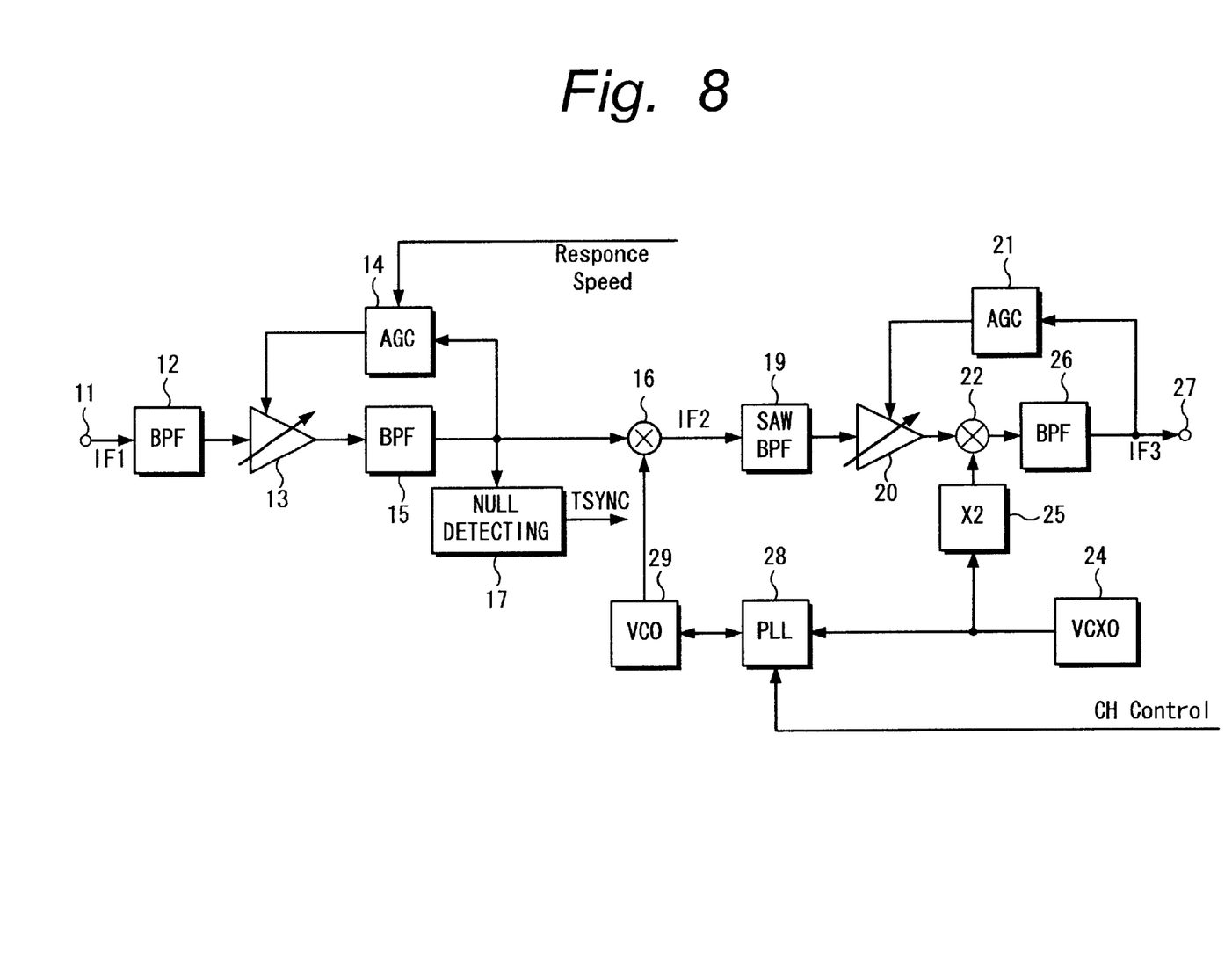
FIG. 8 is a block diagram showing an example of the structure of a front-end portion in the receiver for Eureka DAB System according to the present invention.

FIG. 8 shows the structure of the front-end portion 2 shown in FIGS. 6 and 7. In FIG. 8, the signal received from the antenna 1 or the output signal of the L band down-converter 3 is supplied to an input terminal 11. The signal received from the input terminal 11 is supplied to a variable gain amplifier 13 through a band-pass filter 12. The gain of the variable gain amplifier 13 is controlled corresponding to an output signal of an AGC (Automatic Gain Controlling) circuit 14.

An output signal of the variable gain amplifier 13 is supplied to a mixing circuit 16 through a band-pass filter 15. The output signal of the variable gain amplifier 13 is also supplied to the AGC circuit 14. The AGC circuit 14 detects the signal level of the received signal and controls the gain of the variable gain amplifier 13 corresponding to the output signal of the AGC circuit 14. The response sensitivity of such an AGC loop can be designated corresponding to a response sensitivity designation signal which is supplied from the system controller 5, for example.

An output signal of the band-pass filter 15 is supplied to a null detecting circuit 17. The null detecting circuit 17 detects a null symbol at the beginning of a transmission frame (see FIG. 2). An output signal of the null detecting circuit 17 is used to control the timing and frequency of the received signal.

An output signal of a VCO (Voltage Controlled Oscillator) 29 is supplied to the mixing circuit 16. The oscillation frequency of the VCO 29 is controlled by a PLL (Phase Locked Loop) 28. A channel control signal is supplied to the PLL 28. Corresponding to the channel control signal, the PLL 28 is controlled so that the oscillation frequency of the VCO 29 is designated corresponding to the received channel.

The mixing circuit 16 multiplies the signal received from the antenna 1 or the output signal of the L band down-converter 3 by the output signal of the VCO 29. Thus, a signal of a particular channel is selected from the signal received from the antenna 1 or the output signal of the L band down-converter 3. The selected signal is converted into a second intermediate frequency signal (for example, 38.912 MHz).

An output signal of the mixing circuit 16 is supplied to a variable gain amplifier 20 through an SAW (Surface Acoustic Waves) filter 19. The gain of the variable gain amplifier 20 is controlled corresponding to an output signal of an AGC circuit 21.

An output signal of the variable gain amplifier 20 is supplied to a mixing circuit 22. An output signal of a VCXO (Voltage Controlled Crystal Oscillator) 24 is supplied to the mixing circuit 22 through a frequency multiplying circuit 25. An output signal of the VCXO 24 is supplied to the PLL 28.

The mixing circuit 22 converts the second intermediate frequency signal into a third intermediate frequency signal of for example 3.072 MHz. The third intermediate frequency signal is supplied to an output terminal 27 through a band-pass filter 26. In addition, the third intermediate frequency signal is supplied to the AGC circuit 21. The AGC circuit 21 detects the signal level of the received signal. Corresponding to the detected output signal of the signal level of the received signal, the gain of the variable gain amplifier 20 is controlled.

Figure 9:
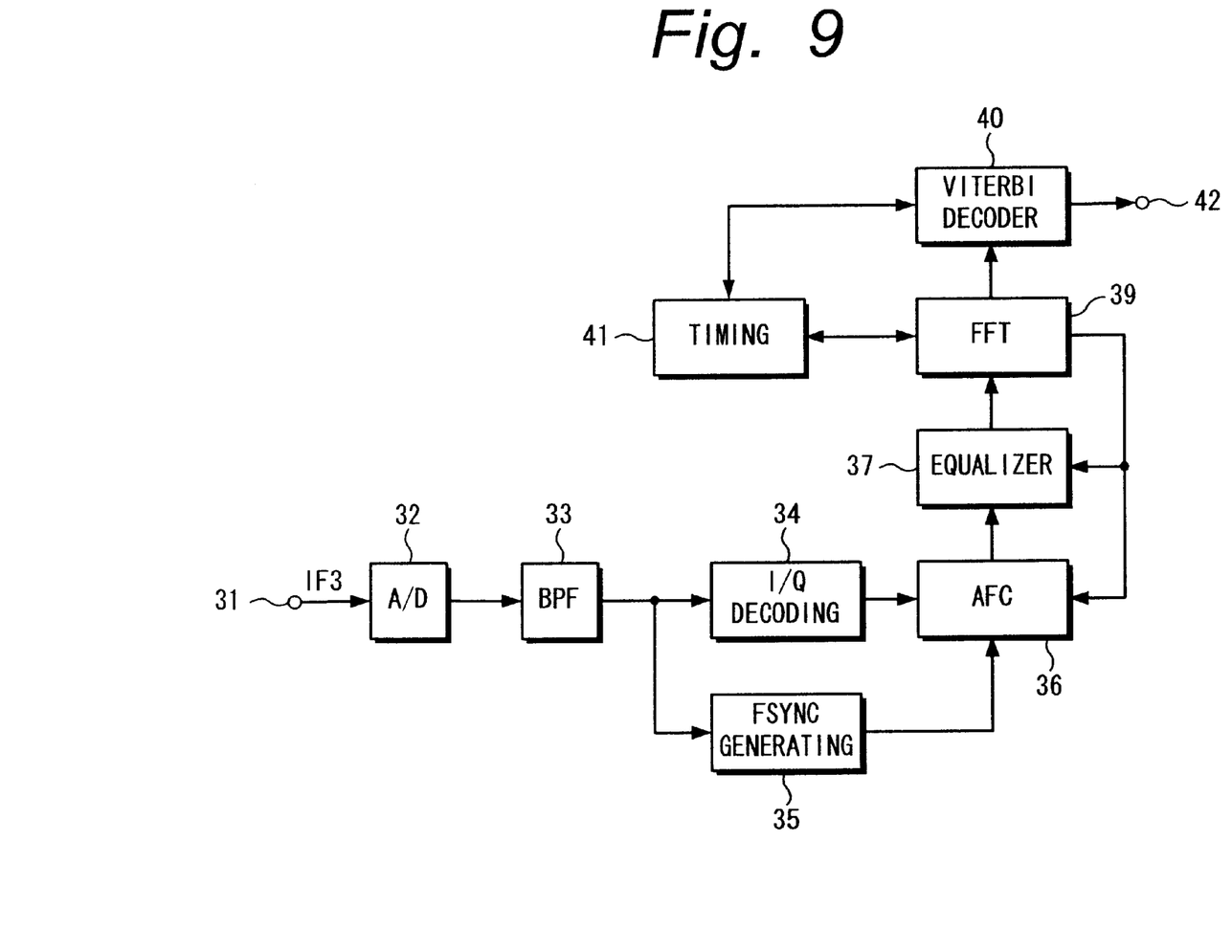
FIG. 9 is a block diagram showing an example of the structure of a channel decoder in the receiver for Eureka DAB System according to the present invention.

FIG. 9 shows the structure of the channel decoder 6 shown in FIGS. 6 and 7.

In FIG. 9, the third intermediate frequency signal of 3.072 MHz is supplied from the front-end portion 2 to an input terminal 31. The signal received from the input terminal 31 is supplied to an A/D converter 32. The A/D converter 32 converts the signal received from the input terminal 31 as an analog signal into a digital signal.

An output signal of the A/D converter 32 is supplied to an I/Q demodulating circuit 34 and a sync be generating circuit 35 through a band-pass filter 33. The I/Q demodulating circuit 34 orthogonally detects the third intermediate frequency signal as received signal and demodulates the received signal to an I signal and a Q signal. Output signals of the I/Q demodulating circuit 34 are supplied to an AFC circuit 36.

The third intermediate frequency signal converted into digital signal is supplied to the sync generating circuit 35 through the band-pass filter 33. The generating circuit 35 detects a null symbol from the third intermediate frequency signal and receives a TFPR signal that is a synchronous reference symbol corresponding to the null symbol. An output signal of the sync generating circuit 35 is supplied to the AFC circuit 36.

An output signal of the AFC circuit 36 is supplied to an equalizer 37. The equalizer 37 removes an influence of a multi-path to the received TFPR signal. The structure of the equalizer 37 will be described later. An output signal of the equalizer 37 is supplied to an FFT circuit 39.

The AFC circuit 36 detects a null symbol output from the sync generating circuit 35, receives an TFPR signal corresponding to the null symbol, performs an FFT process for the TFPR signal from an output signal of the sync generating circuit 35, obtains a frequency error of the received signal corresponding to the result of the FFT process for the TFPR signal, and controls the frequency and timing of the received signal corresponding to the frequency error. In other words, the sync generating circuit 35 obtains the TFPR signal corresponding to the null symbol detected by the null detector 17. The TFPR signal is-.supplied to the G FFT circuit 39. The FFT circuit 39 performs the FFT process for the TFPR signal. The result of the FFT process performed by the FFT circuit 39 is fed back to the AFC circuit 36. The AFC circuit 36 obtains the frequency error and the timing error of the TFPR signal corresponding to the result of the FFT process. The AFC circuit 36 performs the frequency synchronization and the time base synchronization.

The FFT circuit 39 performs the FFT process for the OFDM data orthogonally detected demodulates the OFDM data to the original data. In other words, in Eureka DAB System, when data is transmitted, digital data is correlated with data in frequency region. Data in frequency region is converted into data in time region corresponding to IFET method. With carriers that are orthogonal to each other, data is transmitted. The FFT circuit 39 performs the demodulating process for the OFDM data. The FFT circuit 39 maps the received data and performs the FFT process for the received data. Thus, the received data in time region is converted into a received data in frequency region. Consequently, the received data is demodulated to base band data .

An output signal of the FFT 39 is supplied to a Viterbi coder 40. In addition, the output signal of the FFT 39 is fed back to the equalizer 37 and the AFC circuit 36. The Viterbi decoder 40 performs a maximum likelihood decoding process for a convolutional code so as to perform an error correcting process. The FFT circuit 39 and the Viterbi decoder 40 are controlled by the timing controlling circuit 41. An output signal of the Viterbi decoder 40 is obtained from an output terminal 42.

In the receiver for Eureka DAB System according to the present invention, as shown in FIG. 9, the equalizer 37 is disposed between the AFC circuit 36 and the FFT 39. The equalizer 37 removes the TFPR signal received through a multi-path (see FIG. 4) of a reflected wave.

Figure 10:
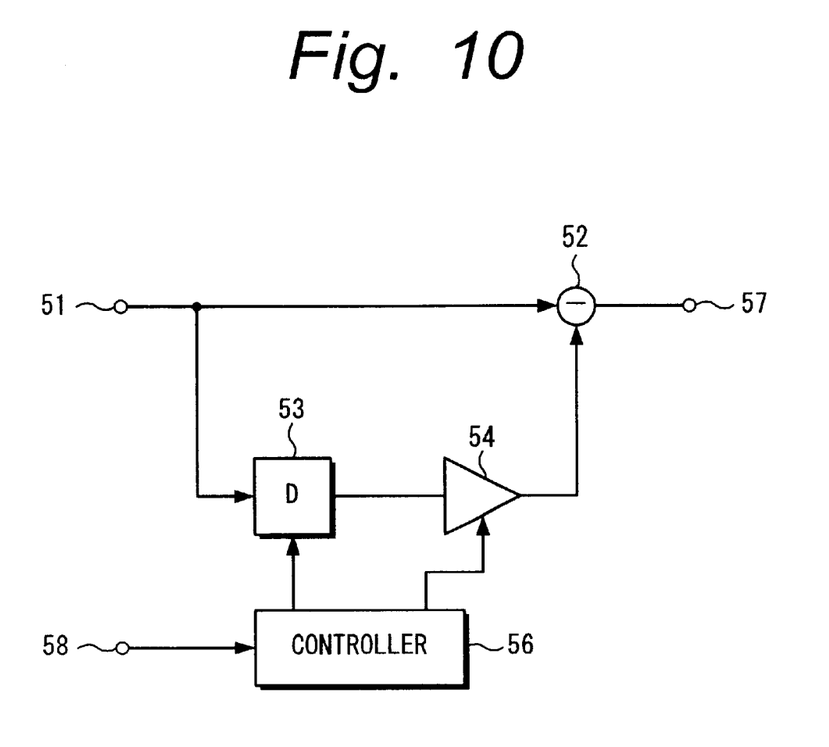
FIG. 10 is a block diagram showing an example of the structure of an equalizing circuit of the channel decoder in the receiver for Eureka DAB System according to the present invention.

For example, the equalizer 37 is structured as shown in FIG. 10. In FIG. 10, the TFPR signal received through the AFC circuit 36 is supplied to an input terminal 51. The received TFPR signal is supplied to a subtracting circuit 52. In addition, the signal is also supplied to the subtracting circuit 52 through a delaying circuit 53 and a gain designating circuit 54.

The subtracting circuit 52 subtracts the TFPR signal input from the input terminal 51 from the TFPR signal through the delaying circuit 53 and the gain designating circuit 54. An output signal of the subtracting circuit 52 is obtained from an output terminal 57.

Correlation data of the TFPR signal is supplied from a terminal 58 to a controller 56. The correlation data is obtained with the resultant signal of the FFT process for the TFPR signal. The delay amount of the delaying circuit 53 and the gain of the gain designating circuit 54 are designated by the controller 56 corresponding to the correlation data.

As shown in FIG. 4, when there is a multi-path, as a TFPR signal, signals through a plurality of paths are obtained. The delay amount of the delaying circuit 53 is designated corresponding to the reception timing of the TFPR signal through a path of a direct wave and the reception timing of the TFPR signal through a path of a reflected wave. The gain of the gain designating circuit 54 is designated corresponding to the ratio of the level of the TFPR signal through the path of the direct wave and the level of the TFPR signal through the path of the reflected wave.

Figure 11A:
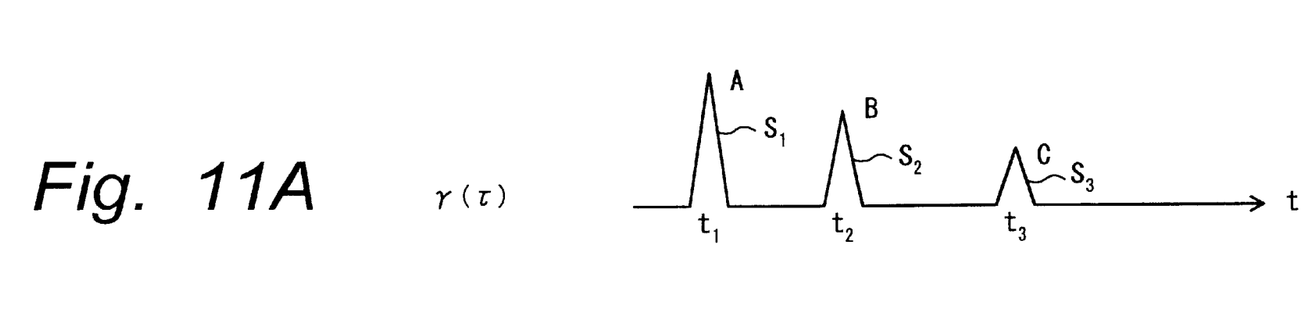
FIGS. 11A to 11C are schematic diagrams for explaining an example of an equalizing circuit of the channel decoder in the receiver for Eureka DAB System according to the present invention.

In other words, when there is a multi-path, as shown in FIG. 11A, at time point $t_1$, a TFPR signal through a path of a direct wave is received. At time points $t_2$ and $t_3$, TFPR signals through paths of reflected waves are received. The TFPR signals through the paths of the reflected waves (namely, the TFPR signals through the multi-path) should be removed.

It is assumed that a TFPR signal $S_1$ as a direct wave at time point $t_1$ is expressed as follows:

$$S_1(t)=Af(t-t_1) \tag{1}$$

that a TFPR signal $S_2$ as a reflected wave at time point $t_2$ is expressed as follows:

$$S_2(t)=Bf(t-t_2) \tag{2}$$

and that a TFPR signal $S_3$ as a reflected wave at time point $t_3$ is expressed as follows:

$$S_3(t)=Cf(t-t_3) \tag{3}$$

It is assumed that the delay amount of the delaying circuit 53 is the period from time point $t_1$ to time point $t_2$ (namely, $t_2-t_1$) and that the gain of the gain designating circuit 54 is designated to (B/A). In this case, the signal $S_2$ of the TFPR signal as the reflected wave at time point $t_2$ can be removed.

In other words, a received signal r(t) is expressed as follows:

$$r(t)=S_1(t)+S_2(t)+S_3(t)=Af(t-t_1)+Bf(t-t_2)+Cf(t-t_3) \tag{4}$$

The delaying circuit 53 delays the received signal by $(t_2-t_1)$. Thus, the resultant signal is expressed as follows.

$$r(t-(t_2-t_1))=S_1(t-(t_2-t_1))+S_2(t-(t_2-t_1))+S_3(t-(t_2-t_1))=Af(t-t_2)+Bf(t-2t_2+t_1)+Cf(t-t_2-t_3+t_1) \tag{5}$$

Assuming that the gain of the gain designating circuit 54 is designated to (B/A), an output signal of the gain designating circuit 54 is expressed as follows:

$$(B/A)\ r\ (t-(t_2-t_1))=Bf(t-t_2)+(B^2/A)\ f\ (t-2t_2+t_1)+(BC/A)\ f\ (t-t_2-t_3+t_1) \tag{6}$$

When the subtracting circuit 55 subtracts the signal expressed by Eq. (6) from the signal expressed by Eq. (4), the resultant signal is expressed as follows.

$$r(t)-(B/A)\ r(t-(t_2-t_1))=Af(t-t_1)+Cf(t-t_3)-(B^2/A)f(t-2t_2+t_1)-(BC/A)f(t-t_2-t_3+t_1)$$

Thus, the signal at time point $t_2$ is removed.

Figure 11B:
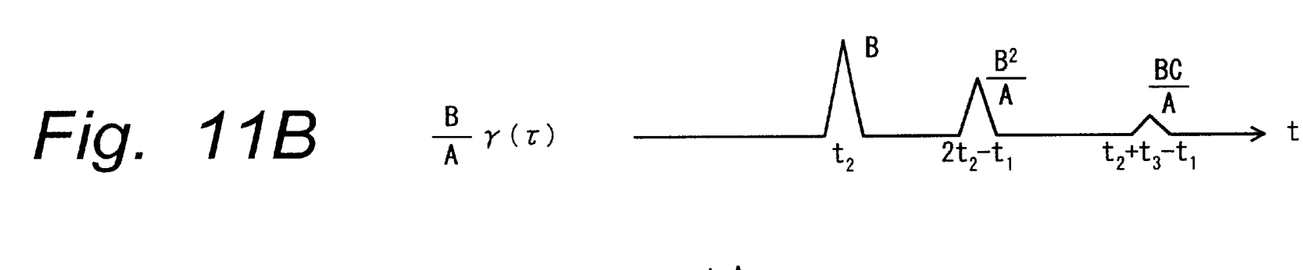

In this case, a TFPR signal shown in FIG. 11A is supplied from the input terminal 51 to one input terminal of the subtracting circuit 52. Since the delay amount of the delaying circuit 53 is $(t_2-t_1)$, a signal with a delay of $(t_2-t_1)$ shown in FIG. 11B is supplied to the other input terminal of the subtracting circuit 52. In addition, since the gain of the gain designating circuit 54 is (B/A), the level of the signal $S_2$ shown in FIG. 11A becomes equal to the level of the signal $S_1$ shown in FIG. 11B.

Figure 11C:
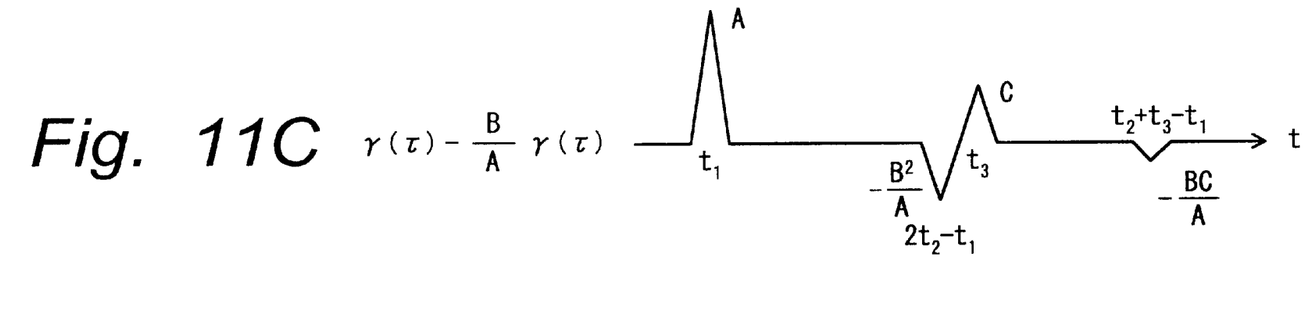

The subtracting circuit 52 subtracts the signal shown in FIG. 11A from the signal shown in FIG. 11B. Thus, as shown in FIG. 11C, the TFPR signal $S_2$ as the reflected wave at time point $t_2$ is removed.

By subtracting the correlation value of the TFPR signal through the path of the direct wave from the correlation value of the TFPR signal through the path of the reflected wave in such a manner that the phase and amplitude of the former match those of the latter, the reflected wave can be removed. By repeating the above-described operation, the influence caused by the multi-path can be further decreased.

When the amplitude of the reflected wave is larger than that of the direct wave, by advancing the TEPR signal received for the period of which the direct wave exists, the reflected wave can be removed.

In the embodiment, the receiver for Eureka DAB System was explained. However, it should be noted that the present invention is not limited to such a receiver. Instead, as long as a reference signal is received and the frequency and timing of a demodulated signal are designated corresponding to the reference signal, the present invention can be applied to other receivers.

According to the present invention, a synchronous reference signal is received. Corresponding to the synchronous reference signal, the frequency error and timing error of the received signal are obtained. Corresponding to the frequency error and the timing error, the frequency and timing of the received signal are controlled. To remove an influence of a multi-path to the synchronous reference signal, an equalizing means is disposed. With the equalizing means, the synchronous reference signal due to the multi-path is removed. Thus, the frequency and timing of the received signal can be correctly controlled.

Industrial Applicability.

As described above, the receiving apparatus according to the present invention is useful for a Eureka DAB System receiver to remove an influence of a multi-path. In particular, the receiving apparatus is suitable for reception of broadcasting or communication for mobile substance such as automobile and so on.

What is claimed is:

1. A receiving apparatus comprising:

a front-end for converting a digital broadcast signal into an intermediate frequency signal, the digital broadcast signal having been modulated in an orthogonal frequency multiplexing method of which data of each frame is composed of a synchronous reference signal and transmission data and of which the data is assigned to a plurality of carriers that are orthogonal to each other;

demodulating means for demodulating the intermediate frequency signal that is output from said front-end into a base band signal corresponding to the synchronous reference signal that is output from detecting means included in the demodulating means for detecting the synchronous reference signal of each frame from the intermediate frequency signal that is output from the front-end;

equalizing means included in the demodulating means for removing a multi-path signal component received through multi-paths from the synchronous reference signal, wherein the multi-path signal component is removed by delaying the detected synchronous reference signal by a time difference between a received timing of the synchronous reference signal received through a reflected path and a received timing of the synchronous reference signal received through a direct path, multiplying the delayed detected synchronous reference signal by a ratio between a reception level of the synchronous reference signal received through the reflected path and a reception level of the synchronous reference signal received through the direct path, and subtracting the detected synchronous reference signal from the multiplied delayed detected synchronous reference signal; and outputting means for outputting the intermediate frequency signal demodulated by said demodulating means in response to the detected synchronous reference signal.

2. The receiving apparatus as set forth in claim 1, wherein said equalizing means comprises:

a delay circuit portion for delaying the synchronous reference signal that is output from the detecting means by a delay amount that is set corresponding to the time difference;

a gain setting portion for setting a gain corresponding to the ratio of the reception levels; and a subtracting portion for subtracting the detected synchronous reference signal that is output from the delay circuit portion through the gain setting portion from the detected synchronous reference signal.

3. The receiving apparatus as set forth in claim 1, wherein said demodulating means comprises:

a detecting portion for orthogonally detecting the intermediate frequency signal that is output from the front-end;

a signal processing portion for performing a fast Fourier transform process for an output signal of the detecting portion through the equalizing means; and a Viterbi decoder to which an output signal of the signal processing portion is supplied.

4. The receiving apparatus as set forth in claim 3, further comprising:

a frequency controlling circuit included between the detecting means and the equalizing means for receiving the synchronous reference signal from the detecting means, obtaining a frequency error of at least the synchronous reference signal with an output signal that is fed back from the signal processing portion, and controlling a frequency of the synchronous reference signal that is output from the detecting means.

5. The receiving apparatus as set forth in claim 1, wherein the outputting means comprises:

a first decoder for decoding audio data output from the demodulating means; and a second decoder for decoding additional data output from the demodulating means.

\* \* \* \* \*